US012644959B2

(12) United States Patent
Kurz

(10) Patent No.: US 12,644,959 B2
(45) Date of Patent: Jun. 2, 2026

(54) RADAR SENSOR APPARATUS FOR A MOTOR VEHICLE AND METHOD

(71) Applicant: VOLKSWAGEN AKTIENGESELLSCHAFT, Wolfsburg (DE)

(72) Inventor: Heiko Gustav Kurz, Hannover (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 327 days.

(21) Appl. No.: 18/262,702

(22) PCT Filed: Jan. 19, 2022

(86) PCT No.: PCT/EP2022/051120
§ 371 (c)(1),
(2) Date: Jul. 24, 2023

(87) PCT Pub. No.: WO2022/157191
PCT Pub. Date: Jul. 28, 2022

(65) Prior Publication Data
US 2024/0393426 A1 Nov. 28, 2024

(30) Foreign Application Priority Data
Jan. 25, 2021 (DE) ..................... 10 2021 200 639.6

(51) Int. Cl.
*G01S 7/03* (2006.01)
*G01S 7/02* (2006.01)
(Continued)

(52) U.S. Cl.
CPC ................ *G01S 7/03* (2013.01); *G01S 7/028* (2021.05); *G01S 7/282* (2013.01); *G01S 13/931* (2013.01)

(58) Field of Classification Search
CPC . G01S 7/03; G01S 7/028; G01S 7/282; G01S 13/931
See application file for complete search history.

(56) References Cited

U.S. PATENT DOCUMENTS 6,124,827 A * 9/2000 Green ................. H01Q 3/2682
342/372
7,110,632 B2 9/2006 Abeles
(Continued)

FOREIGN PATENT DOCUMENTS

CN 111800199 A 10/2020
JP 2001324563 A 11/2001
(Continued)

OTHER PUBLICATIONS

P. Berini, "Surface plasmon enhanced optoelectronics," 2014 8th International Congress on Advanced Electromagnetic Materials in Microwaves and Optics, Copenhagen, Denmark, 2014, pp. 61-63, (Year: 2014).*
(Continued)

*Primary Examiner* — Resha Desai
*Assistant Examiner* — Naomi M Wolford
(74) *Attorney, Agent, or Firm* — BARNES & THORNBURG LLP

(57) ABSTRACT

A radar sensor apparatus for a transportation vehicle having a central electronic computing device to generate an electrical control signal for a transmitting device; a laser device which, in accordance with the electrical control signal, generates an optical transfer signal for transfer to the transmitting device; a transformation device having at least one first optical ring resonator which, in accordance with the optical transfer signal, generates a pulse train, the transformation device generates an electrical emission signal in accordance with the pulse train; the transmitting device which is designed to emit the electrical emission signal; and (Continued)

a receiving device for receiving an electrical receive signal and for transferring the electrical receive signal to the central electronic computing device. Also disclosed is a method for operating the radar sensor apparatus.

16 Claims, 4 Drawing Sheets

(51) Int. Cl.
    *G01S 7/282*        (2006.01)
    *G01S 13/931*     (2020.01)

(56) References Cited

U.S. PATENT DOCUMENTS

| | | | |
|---|---|---|---|
| 7,324,267 | B2 | 1/2008 | Melloni et al. |
| 7,634,201 | B2 | 12/2009 | Maleki et al. |
| 8,447,145 | B2 | 5/2013 | Goldring et al. |
| 8,761,603 | B1 * | 6/2014 | Maleki .................... G01S 13/86 398/129 |
| 8,805,130 | B2 | 8/2014 | Lipson et al. |
| 9,134,169 | B2 | 9/2015 | Li et al. |
| 9,977,206 | B2 | 5/2018 | Vaidyanathan et al. |
| 2017/0163351 | A1 | 6/2017 | Puleri et al. |
| 2018/0102847 | A1 * | 4/2018 | Kim ........................ G02F 1/025 |
| 2020/0182978 | A1 | 6/2020 | Maleki et al. |
| 2022/0113398 | A1 * | 4/2022 | Maleki .................. G01S 13/865 |

FOREIGN PATENT DOCUMENTS

| | | | |
|---|---|---|---|
| WO | 2019034919 | A1 | 2/2019 |
| WO | 2022084063 | A1 | 4/2022 |

OTHER PUBLICATIONS

Pan et al.; Microwave Photonic Radars; Journal of Lightwave Technology; IEEE; May 7, 2020; vol. 38, No. 19; pp. 5450-5484.

Serafino et al.; Microwave Photonics for Remote Sensing: From Basic Concepts to High-Level Functionalities; Journal of Lightwave Technology; IEEE; Apr. 22, 2020; vol. 38, No. 19; pp. 5339-5355.

International Search Report; International Patent Application No. PCT/EP2022/051120; May 17, 2022.

* cited by examiner

RADAR SENSOR APPARATUS FOR A MOTOR VEHICLE AND METHOD

PRIORITY CLAIM

This patent application is a U.S. National Phase of International Patent Application No. PCT/EP2022/051120, filed 19 Jan. 2022, which claims priority to German Patent Application No. 10 2021 200 639.6, filed 25 Jan. 2021, the disclosures of which are incorporated herein by reference in their entireties.

SUMMARY

Illustrative embodiments relate to a radar sensor apparatus for a transportation vehicle and a method for operating such a radar sensor apparatus.

BRIEF DESCRIPTION OF THE DRAWINGS

Disclosed embodiments are described hereinafter with reference to the figures, in which.

DETAILED DESCRIPTION

Figure 1:
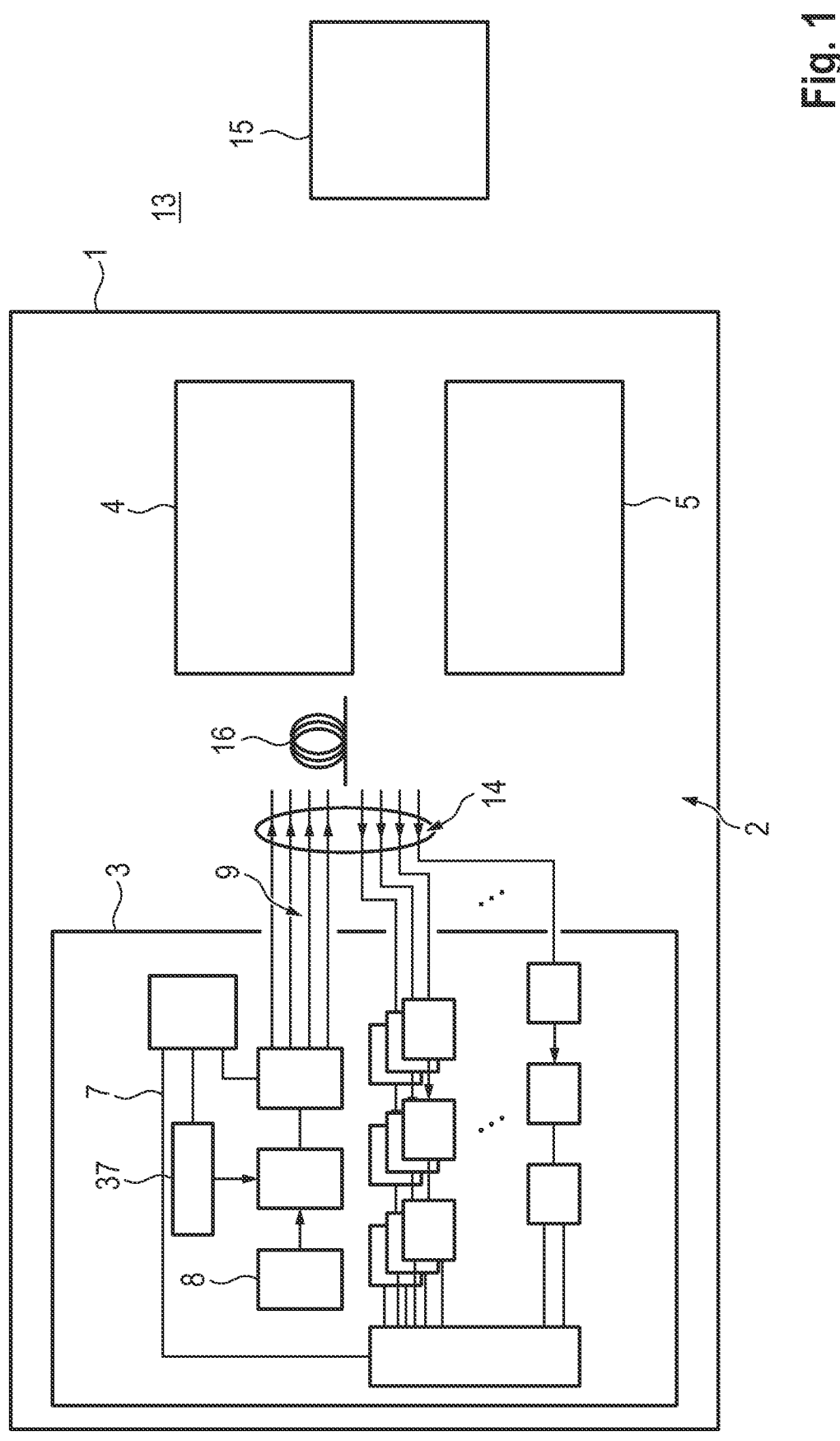
FIG. 1 shows a schematic view of a disclosed embodiment of a transportation vehicle having an exemplary embodiment of a radar sensor apparatus.

Radar sensor apparatuses for transportation vehicles are already known from automotive engineering. In particular, such radar sensor apparatuses are used, for example, in at least partially autonomously operated transportation vehicles, but also in fully autonomously operated transportation vehicles. To enable such an automated journey, a reliable surroundings perception is indispensable. The surroundings or the environment is detected in this case with the aid of sensors such as radar, lidar, and camera. An integrated 360° three-dimensional detection of the environment is particularly important, so that all static and dynamic objects can be detected. In particular, lidar has a supporting role in redundant, robust surroundings detection, since this sensor type can measure distances precisely in the surroundings detection and can also be used for classification. However, these lidar sensors are costly and are complex in their structure. In particular, 360° three-dimensional surroundings detection is problematic, since either many smaller individual sensors are necessary to ensure this, which generally operate using many individual light sources and detector units, or large lidar sensors are installed. Furthermore, lidar sensors are susceptible to weather influences such as rain, fog, or direct sunlight.

Radar sensors or radar sensor apparatuses are also established from automotive engineering and supply data reliably and in a failsafe manner in all weather conditions. Even poor visibility conditions such as rain, fog, snow, dust, or darkness hardly influence their perception reliability. However, according to the prior art, the resolution has heretofore been restricted, in particular, mass-produced radars in use are only designed having a resolution of approximately 7°. To achieve the requirements for an increased automation level in automotive engineering with secured driving functions, it is provided that the radar sensor apparatus supplies three-dimensional images having a high resolution in the range of 0.1° and less having a high level of insensitivity with respect to disturbances from its environment. This is not achieved using the conventional radar technology according to the prior art, since the resolution of such systems is too low.

In particular, photonic radar sensor apparatuses are furthermore already known, which implement an increase of the resolution in that electronic and photonic components are cointegrated in a single semiconductor point. The tracking of an FMCW signal, and the overall signal processing and evaluation are carried out here by a central station. Each transmitting and receiving module includes an electronic-photonic cointegrated chip, a so-called epic chip. A silicon-photonic technology is used for the cointegration. This enables the monolithic integration of photonic components, high-frequency electronics, and digital electronics jointly on one chip. The technical innovation of such a system is in this case the signal transmission of gigahertz signals by the optical carrier signal in the terahertz frequency range. A central station, which can also be designated as a central electronic processing unit, generates an optical carrier frequency in terahertz. In this way, the signal to be transmitted is modulated with an eighth of the radar frequency and transmitted via optical phase to the antenna chip. An eightfold frequency multiplication takes place thereon, so that the radar radiation can be emitted from the antenna chips. The signal detection takes place on the reverse path. All data are processed on the central station. However, such an exemplary embodiment is very complex in the implementation of gigahertz electronics on the chip level. In particular, the fourfold frequency multiplication taking place on the chip after detection by a photodiode is technically challenging and places high demands with respect to the gigahertz signal generation having high signal-to-noise ratio and the least possible jitter. The gigahertz signal thus has to be complexly stabilized in further operations. In addition, the gigahertz electronics are costly. Furthermore, high power demands are placed on the optical carrier, in particular, a laser, since a large amount of optical power is required to generate a high-precision gigahertz signal, which makes a ring line having a single phase for radar array having many distributed radar semiconductor chips difficult to implement. In particular, furthermore two different photonic-electronic semiconductor chips are required for a respective transmitting and receiving channel, which results in further cost expenditures.

U.S. Pat. No. 8,805,130 B2 discloses an integrated electro-optical structure, such as a modulator and a switch, and a method for the production thereof. In an illustrative embodiment, an apparatus comprises a substrate having a waveguide and an optical resonator, which comprises polycrystalline silicon, that is arranged on the substrate. First and second doped semiconducting areas also comprise polycrystalline silicon and are arranged in the vicinity of the first optical resonator. The first optical resonator is coupled for communication with the waveguide.

U.S. Pat. No. 7,324,267 B2 discloses a wavelength converter apparatus for generating converted radiation having a frequency by interaction between at least one signal radiation having a frequency and at least one pump radiation having a frequency, having an input for the at least one signal radiation having a frequency, a pump light source for generating the at least one pump radiation having a frequency, an output for removing the converted radiation having a frequency, a structure for transmitting the signal radiation, which contains two optical resonators having a nonlinear material, which have an optical length of at least 40 times lambda/2, wherein lambda is the wavelength of the pump radiation, and which are in resonance at the pump, signal, and converted frequencies, wherein the pump and signal radiation, by propagation through the structure, generate the converted radiation by nonlinear interaction within the optical resonators.

U.S. Pat. No. 7,634,201 B2 discloses tunable receivers and technologies for receiving an electrical oscillator signal in the HF, microwave, or millimeters spectral range on the basis of the photonic technology, to use both photonic or optical components and electronic circuit components.

Disclosed embodiments provide a radar sensor apparatus and a method, using which improved surroundings detection can be implemented.

This is achieved by a radar sensor apparatus and by a method.

At least one disclosed embodiment relates to a radar sensor apparatus for a transportation vehicle, wherein the transportation vehicle can be designed to be at least partially autonomous, in particular, fully autonomous. The radar sensor apparatus includes a central electronic processing unit, which is designed to generate an electrical control signal for a transmitting unit of the radar sensor apparatus. Furthermore, the radar sensor apparatus comprises a laser unit, which generates an optical transmission signal for transmission to the transmitting unit as a function of the electrical control signal. The radar sensor apparatus includes a transformation unit having at least one first optical ring resonator, which can be designed, for example, as a micro-ring resonator, which generates a pulse train as a function of the optical transmission signal, wherein the transformation unit is additionally designed to generate an electrical emission signal as a function of the pulse train for the transmitting unit. The transmitting unit is designed to emit the electrical emission signal into the surroundings of the transportation vehicle. Furthermore, the radar sensor apparatus includes a receiving unit for receiving an electrical reception signal, which corresponds to the electrical emission signal and is reflected in the surroundings, and for transmitting the electrical reception signal to the central electronic processing unit.

In particular, the disclosed radar sensor apparatus thus achieves that standard telecommunication lasers can be used in this radar sensor apparatus. In particular, a complex and costly design of gigahertz circuits for frequency conversion of RF signals with optical carriers is thus dispensed with. After the conversion from the terahertz spectral range, in particular, the gigahertz signal is stabilized. The chip area can thus be reduced in size in relation to conventional electronics. The transformation unit therefore replaces the epic chip or chips. The transformation unit can also be designated hereinafter as a chip. The ring line is very easily implementable, wherein the high quality factor of the optical ring resonator causes a low-power demand of the laser, so that coupling losses can be compensated for and many chips can be operated using one source. The gigahertz signal is inherent and stable. Furthermore, the transmitting unit and the receiving unit are integratable on a single semiconductor chip, for example, in a CMOS, SiN-CMOS, Bi-CMOS, hybrid Bi-CMOS or using processes on photonic-electronic cointegrated chips.

In particular, the disclosed embodiment thus utilizes the fact that the radiation of the laser unit, which can also be designed as a CW laser, is coupled into a photonic semiconductor by an optical interface. The radiation propagates within a linear waveguide structure located in the semiconductor. A further ring-shaped waveguide structure is arranged at a very small distance to the linear waveguide structure on the semiconductor. If the spacing of the two waveguides is sufficiently small that the evanescent field of the electromagnetic radiation protrudes from the linear waveguide into the ring conductor, radiation is coupled from the linear waveguide into the ring conductor, which propagates therein. If the optical path length of the ring is selected so that it is an integer multiple of the wavelength, the light propagating in the ring conductor thus constructively interferes after one revolution cycle with the coupled-in evanescent field and amplification occurs. Since the interaction zone between linear and ring-shaped waveguide is in the range of the wavelength, the interaction of both fields is only of a short duration, so that only constructive interference takes place. An optical ring resonator is thus formed. More laser radiation is coupled into the ring conductor than results as losses up to and including the beginning of a saturation of the resonator-internal power. A part of the light propagating inside the ring waveguide is decoupled back into the linear waveguide after the completion of each cycle and can be used as a signal. The light is amplitude-modulated by the ring resonator with suitable selection of diameter and coupling ratio of the waveguide, so that a pulse having high peak intensity is formed from a CW input signal. In the semiconductor, the diameter of the optical ring resonators extends from a few hundred micrometers up to a few micrometers. The circulation time of the light determines a repetition rate frep of the output signal or the pulse train here.

Ring resonators designed in this way have high quality factors of Q greater than 106, which result in peak intensities within the resonator that can drive nonlinear optical processes, so-called multi-photon processes. These occur during the interaction of light of high intensity and material. The development of the electrical polarization P is an established model here to describe multiphoton processes in the light-material interaction.

$$P = \varepsilon_0 \left[ X^{(1)}E + X^{(2)}E^2 + X^{(3)}E^3 + X^{(4)}E^4 + \dots \right]$$

wherein P describes the electrical pulsation, X describes the sensitivity, E describes the electrical field, and ε0 describes the electrical constant.

While the linear term having electrical sensitivity X(1) scales linearly with the electrical field, higher-order terms X(n) having n greater than 1 have a nonlinear proportionality to the electrical field strength. These processes are called multiphoton processes. In this case, the number of the required photons scales with the order n of X(n). Effects such as frequency doubling or sums and difference frequency generation require two photons, generate photons of corresponding frequency of the fundamental light frequency, and thus induce a second-order nonlinearity in the material. Third-order effects, such as frequency tripling or the like, require three photons for frequency conversion of the third order and the like. These effects of the nonlinear light-material interaction offer the possibility of modulating an incident light source nonlinearly.

In the optical ring resonator, with coupling extending into the ring, the nonlinear index of refraction therefore cannot be neglected. Thus, for example, due to the Kerr effect, in particular, at a sensitivity of X(2), four-wave mixing processes occur during the interaction of light of high peak intensity with the waveguide. Due to the continuous growth of the intensity in the resonator ring, initially a degenerative four-wave mixing process occurs here. Two photons YP of the CW laser are absorbed therein, which is called optical pumping, and an electron is raised to a virtual or real energetically higher level. The electron falls back into the base state after a short time, in particular, in a stimulated manner. At this time, it emits the absorbed energy as a signal photon and an idler sideband photon (YS and YI, respectively), which only correspond in the sum with the photon energy with the two photons of the CW laser. New spectral components are therefore generated within the ring resonator. Signal photon and idler sideband photon are correlated due to the coherent occurrence process in phase, amplitude, and frequency. Due to the increasing frequency conversion into YP after YS or YI, the ring resonator is bistable, so that slight variances in phase and frequency result, which in turn generate new side bands of the side bands. A non-degenerative four-wave mixing process begins and the generation of new frequencies cascades. The newly generated frequencies are in fixed phase and frequency relationship to one another, the spectral modes are accordingly coupled. Due to this beginning mode coupling, a fundamental soliton develops, so that a pulse of high spectral bandwidth is formed, which propagates free of dispersion in the ring resonator and reproduces at the resonator frequency frep. A pulsed signal, which is distinguished by an extremely high signal-to-noise ratio and low temporal variances, is thus formed from a CW laser signal.

Further, complex waveguide structures can be used to generate the pulse status. Thus, for example, a second waveguide on the opposite side of the ring resonator can be used to decouple the pulse train. Furthermore, further resonator rings having coupling points can be used for further coupling between the ring resonators, which permit the corresponding frequency ranges of frep to be tuned. For example, these ring arrangements can generate pulses with frep=100 MHz for the values of R=15 μm and R=5 μm.

According to at least one exemplary embodiment, the transformation unit includes an optical coupling element, which is designed for coupling the optical transmission signal into the optical ring resonator. In particular, the optical transmission signal, which was generated by the laser unit, can thus be coupled into the semiconductor chip on which the optical ring resonator is formed.

It is furthermore beneficial if the transformation unit includes an optical photodiode for generating an emission signal as a function of the pulse train. In particular, the optical pulse train can thus be transmitted to the diode, wherein this in turn converts the optical pulse train into the electrical emission signal. In particular, this pulse train can be passed on to a power amplifier, which then in turn emits the signal via the emission unit.

In a further exemplary embodiment, the transmitting unit and the receiving unit are formed as a common component. In particular, the transmitting antenna and the receiving antenna are thus formed on a common chip. In particular, the transmitting antenna and the receiving antenna are therefore formed as one unit. A single chip can thus fulfill both functions, which reduces the costs. In particular, by fine-tuning the laser frequency of the emitted laser of the laser unit, it is possible to prevent an excessive amount of light from being coupled into the optical ring resonator and mode coupling beginning. A pulsed signal therefore cannot be generated in the emission channel of the transmitting unit. The chip operates in this case as the receiving channel. A single chip can therefore fulfill both functions, which lowers additional costs and reduces components.

It is also beneficial if the transformation unit includes at least one further optical ring resonator which is designed differently from the first optical ring resonator, wherein the pulse train is generated as a function of the first optical ring resonator and the further optical ring resonator. The frequency ranges for the pulse train frep in the megahertz range can accordingly be generated by the use of a further ring resonator. For example, using values for the first optical ring resonator R=15 μm and for values of the further optical ring resonator of R=5 μm, pulses having a frequency of frep=100 MHz can then be generated.

Furthermore, it has proven to be beneficial if the transformation unit includes a heterodyne detection unit or a homodyne detection unit for generating the emission signal. In particular, a frequency comb can thus be used for synthesizing the gigahertz frequency ramps. For this purpose, the homodyne detection unit or a heterodyne detection unit is implemented on the electronic-photonic chip, thus the transformation unit. An optical heterodyne detection is optionally carried out.

It is furthermore beneficial if the transformation unit includes at least one dispersive element, which is designed to generate at least one frequency chirp as a function of the pulse train. This frequency comb or frequency chirp can then be used to synthesize the gigahertz frequency ramps. If a Fourier-limited pulse train now propagates through a dispersive medium, for example, air, the high-frequency spectral components thus experience a stronger time delay than the low-frequency spectral components. The pulse train is thus positively chirped and therefore stretched in time. Furthermore, its peak intensity decreases. For example, the decoupling waveguide can function as the dispersive element. It is particularly beneficial here that a fundamental soliton propagates in the ring conductor, which is inherently dispersion-free.

According to a further exemplary embodiment, the transformation unit includes at least one second optical ring resonator, wherein a second pulse train, which is different from the pulse train, is generated by the second optical ring resonator, wherein the frequency chirp is generated by a heterodyne detection unit of the transformation unit as a function of the pulse train and the second pulse train. In particular, a photonic-electronic cointegrated radar chip is therefore formed by two defined frequency combs and a dispersive element. The frequency combs are generated by the two different ring resonators. A frequency chirp is applied to the individual pulses by dispersion and both signals are measured by the heterodyne detector unit. The resulting frequencies again form a ramp in the gigahertz spectral range.

Furthermore, it has proven to be beneficial if the transformation unit includes at least two nano-antennas on a semiconductor medium for generating the emission signal as a function of the pulse train. In particular, the pulse repetition rate is therefore detected by the nano-antennas, which are located on a dielectric material or semiconductor. These metal antennas having dimensions in the range of a few micrometers to nanometers are located spaced apart at a distance of the wavelength of the incident light from one another. If the radiation emitted by the optical ring resonator is incident on the nano-antennas, a plasmon resonance is excited or a surface plasmon polariton is induced, which oscillates at the frequency of the incident light wave, by the distance of the wavelength between the nano-antennas. These frequency oscillations are directly electronically measurable and can be used as the driver signal of the gigahertz antenna.

A further exemplary embodiment relates to a transportation vehicle having a radar sensor apparatus according to the preceding embodiment. The transportation vehicle is designed as an at least partially autonomously operated transportation vehicle, in particular, as a fully autonomously operated transportation vehicle.

Still a further exemplary embodiment relates to a method for operating a radar sensor apparatus according to the preceding embodiment. An electrical control signal for a transmitting unit of the radar sensor apparatus is generated by a central electronic processing unit of the radar sensor apparatus. An optical transmission signal is generated as a function of the electrical control signal to be transmitted to the transmitting unit by a laser unit of the radar sensor apparatus. A pulse train is generated as a function of the optical transmission signal by a transformation unit of the radar sensor apparatus using at least one first optical ring resonator, wherein in addition an electrical emission signal is generated as a function of the pulse train for the transmitting unit by the transformation unit. Furthermore, the electrical emission signal is emitted into the surroundings of the transportation vehicle by the transmitting unit. An electrical reception signal corresponding to the electrical emission signal and reflected in the surroundings is received by a receiving unit of the radar sensor apparatus and the electrical reception signal is transmitted to the central electronic processing unit by the receiving unit. In particular, the reception signal is then furthermore evaluated within the central electronic processing unit.

Disclosed embodiments of the radar sensor apparatus are to be viewed as exemplary embodiments of the transportation vehicle and the method. The radar sensor apparatus and the transportation vehicle include objective features for this purpose, which enable the method or an exemplary embodiment thereof to be carried out.

The disclosed embodiments also include refinements of the transportation vehicle and the method, which include features as have already been described in conjunction with the refinements of the disclosed radar sensor apparatus. For this reason, the corresponding refinements of the disclosed transportation vehicle and the disclosed method are not described once again here.

The disclosed embodiments also comprise the combinations of features of the described embodiments.

In the exemplary embodiments, the described components each represent individual features of the disclosure to be considered independently of one another, which each also refine the disclosure independently of one another and are therefore also to be considered to be part of the disclosure individually or in a combination other than that shown. Furthermore, the described exemplary embodiments can also be supplemented by further ones of the features of the disclosure already described.

Functionally identical elements are each provided with the same reference signs in the figures.

FIG. 1 shows a schematic top view of a disclosed embodiment of a transportation vehicle 1 having an exemplary embodiment of a radar sensor apparatus 2. The radar sensor apparatus 2 includes at least one central electronic processing unit 3, a transmitting unit 4, and a receiving unit 5. Furthermore, the radar sensor apparatus 2 includes a transformation unit 6 (FIG. 2), which is not shown in FIG. 1.

The radar sensor apparatus 2 includes the central electronic processing unit 3, which is designed to generate an electrical control signal 7 for the transmitting unit 4. A laser unit 8, which generates an optical transmission signal 9 for transmission to the transmitting unit 4 as a function of the electrical control signal 7, is also provided. The transformation unit 6 includes at least one optical ring resonator 10 (FIG. 2), which generates a pulse train 11 (FIG. 2) as a function of the optical transmission signal 9, wherein the transformation unit 6 is additionally designed to generate an electrical emission signal 12 (FIG. 2) as a function of the pulse train 11 for the transmitting unit 4. The transmitting unit 4 is designed to emit the electrical emission signal 12 into the surroundings 13 of the transportation vehicle 1. The receiving unit 5 is designed to receive a reception signal 14 corresponding to the electrical emission signal 12, wherein the reception signal 14 is reflected in the surroundings 13, for example, at an object 15. The receiving unit 5 furthermore transmits the electrical reception signal 14 to the central electronic processing unit 3.

The generation of the FMCW signal and all of the signal processing and evaluation are carried out here by the central electronic processing unit 3. The transmitting unit 4 and the receiving unit 5 can each individually consist of an electric-photonic correlated chip here. In particular, the technical possibility exists here of carrying out the signal transmission of gigahertz signals, which correspond to the emission signal 12, by an optical carrier signal in the terahertz frequency range, which corresponds to the transmission signal 9. The central electronic processing unit 3 generates the optical carrier frequency here. The signal to be transmitted is modulated thereon at ⅛ the radar frequency, which is represented by the block 37, and transmitted via optical phase 16 to the transmitting unit 4. An eightfold frequency multiplication takes place thereon, so that the radar radiation can be emitted by the transmitting unit 4. The signal detection takes place on the reverse path. All data are processed on the central electronic processing unit 3.

Figures 2, 3:
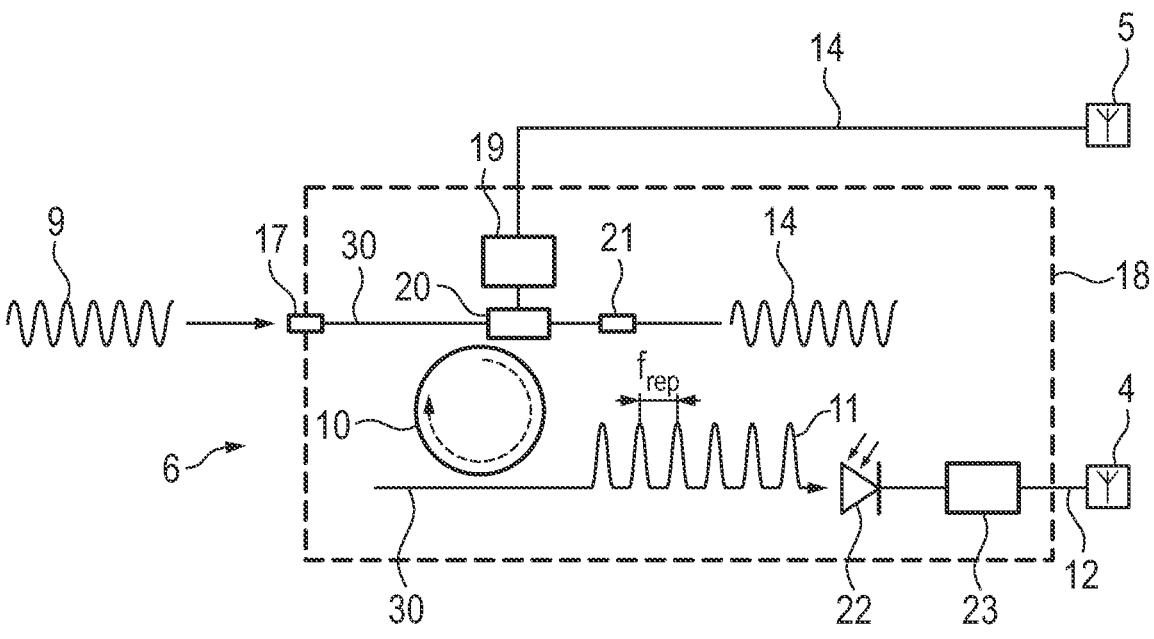
FIG. 2 shows a schematic block diagram of a disclosed embodiment of a transformation unit of an exemplary embodiment of the radar sensor apparatus.
FIG. 3 shows a further schematic block diagram of a further disclosed embodiment of a transformation unit of an exemplary embodiment of a radar sensor apparatus.

FIG. 2 shows a schematic block diagram of an exemplary embodiment of the transformation unit 6. The transmission signal 9 is coupled in by an optical coupling element 17. The optical coupling element 17 is already located on a semiconductor 18. Furthermore, a radio frequency driver 19, an optical modulator 20, and a further optical coupling element 21 are formed on the semiconductor 18. Furthermore, FIG. 2 shows that a photodiode 22 and a power amplifier 23 are formed on the semiconductor 18.

In particular, FIG. 2 shows that with suitable selection of the geometry of the optical ring resonator 10, a pulse repetition rate frep of, for example, 76 GHz can be generated. This pulse train 11 can be detected by the photodiode 22 on the semiconductor 18 and passed on directly via the power amplifier 23 to the transmitting unit 4, since the photo current is proportional to frep. It is beneficial here that further costly and complexly designed gigahertz electronics can be reduced. Since the optical ring resonator 10 has an extremely low power consumption of 1 μW, the transmission signal 9 can be passed on and, for example, a ring arrangement for radar chips can be implemented. In addition, the reception signal 14 can again be modulated by the optical modulator 20 onto the transmission signal 9.

In particular, FIG. 2 thus shows a schematic illustration of a photonic-electronic radar chip having the optical ring resonator 10. The pulse train 11 is detected directly by the photodiode 22. The photo current is proportional here to frep and can be given directly as a driver signal to the power amplifier 23, which emits the emission signal 12 via the transmitting unit 4. The received reception signal 14 is mixed by the optical modulator 20 onto the original transmission signal 9 and passed on to the central electronic processing unit 3 for data processing.

FIG. 3 shows a further schematic embodiment of a transformation unit 6. It is shown in the following exemplary embodiment that the transmitting unit 4 and the receiving unit 5 are formed as a common component. In particular, these are therefore formed as a single chip. The same transformation unit 6 is therefore used for the transmitting unit 4 and the receiving unit 5. By fine-tuning the laser frequency of the transmission signal 9, an excessive amount of light being coupled into the optical ring resonator 10 and mode coupling beginning is prevented. A pulsed signal is thus not generated in the receiving channel. The transformation unit 6 operates in this case as the receiving channel. A single chip can thus fulfill both functions, which reduces additional costs.

Figure 4:
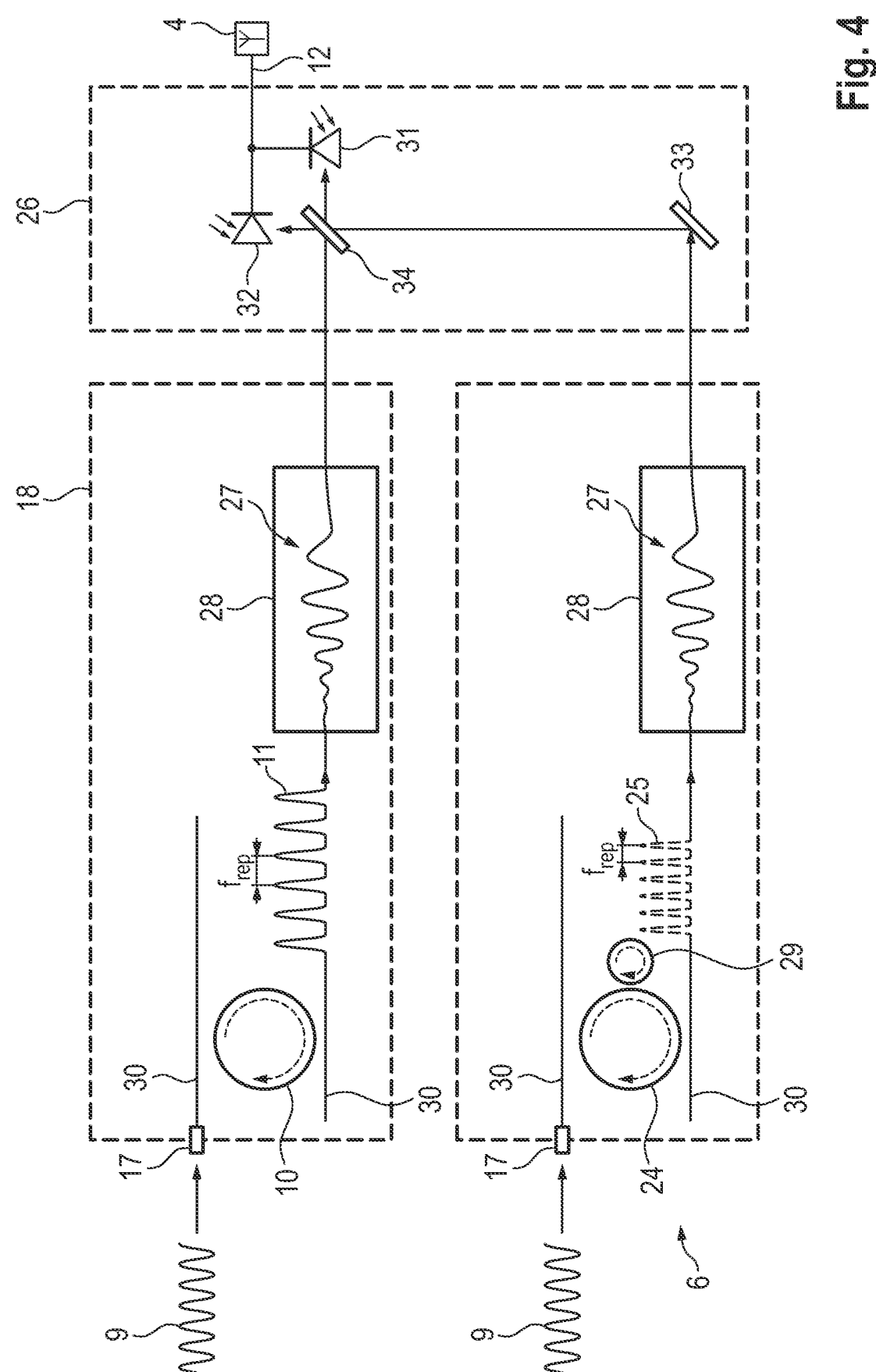
FIG. 4 shows a further schematic block diagram of a disclosed embodiment of a transformation unit of an exemplary embodiment of a radar sensor apparatus.

FIG. 4 shows a further schematic block diagram of a further disclosed embodiment of a transformation unit 6. The following exemplary embodiment shows that the transformation unit 6 can include a second optical ring resonator 24, wherein a second pulse train 25, which is different from the pulse train 11, is generated by the second optical ring resonator 24, wherein a frequency chirp 27 can be generated by a heterodyne detection unit 26 of the transformation unit 6 as a function of the pulse train 11 and the second pulse train 25. In particular, the transformation unit 6 includes at least one dispersive element 28 for this purpose, which is designed to generate the at least one frequency chirp 27 as a function of the pulse train 11 and/or the second pulse train 25. Alternatively to the heterodyne detection unit 26, the transformation unit 6 can also include a homodyne detection unit for generating the emission signal 12.

Furthermore, FIG. 4 shows that the transformation unit 6 can include at least one further optical ring resonator 29, which is designed differently from the first optical ring resonator 10 and in the present case from the second optical ring resonator 24, wherein the pulse train 11, in the present case the second pulse train 25, is generated as a function of the first optical ring resonator 10, in the present case of the second optical ring resonator 24, and the further optical ring resonator 29.

FIG. 4 furthermore shows that the optical coupling element 17 can be coupled to a linear waveguide 30.

In particular, FIG. 4 shows that the pulse sequence forming in the optical ring resonator 10, 24, 29 can represent a frequency comb in Fourier space. The pulse duration defines the spectral bandwidth of the entire comb here, while the bandwidth of the individual modes is given by the length of the pulse train 11, 25. The interval of the individual modes in the frequency comb is in turn defined by the pulse repetition rate frep.

This frequency comb can be used to synthesize the gigahertz frequency ramps. For this purpose, a homodyne detection unit or, as shown in the present case, the heterodyne detection unit 26 is implemented on the electronic-photonic chip, in the present case, for example, the semiconductor 18. The optical signal of the frequency comb ES is overlaid via a beam splitter 34 with the signal of a local oscillator ELo, such as the CW laser signal, on two photodiodes 31, 32. The photo current resulting there can be measured:

$$i_{phot}(t) \sim \left| \hat{E}_S(t) + \hat{E}_{LO}(t) \right|^2$$

wherein the signal(S) is described by:

$$i_{phot}(t) \sim \left| \hat{E}_S(t) + \hat{E}_{LO}(t) \right|^2$$

while the local oscillator (LO) is given by:

$$\hat{E}_{LO}(t) = E_{LO} \cdot e^{-i(\omega_{LO} t + \phi_{LO})}$$

Due to a phase jump by $\pi$ at the beam splitter 34, the signal of the LO experiences a sign change in the exponent. The measured photocurrent results as:

$$\Rightarrow i_{phot}(t) \sim |E_S|^2 + |E_{LO}|^2 + E_S \cdot E_{LO} \cdot \cos(2\pi \cdot (f_S - f_{LO}) \cdot t + \Delta \phi)$$

By measuring the difference of the two photocurrents Iphot1 and Iphot2, the two constant terms |ES|2+|ELO|2 can be subtracted and the difference frequency and the difference phase remain. The difference frequency is in the range of frep and can in turn be used as a gigahertz signal. In addition, the mixed term ES×ELO supplies an inherent amplification of weak signals ES.

The heterodyne detection unit 26 can include a mirror element 33 and the beam splitter 34 here.

FIG. 4 in particular shows a method for generating defined frequency combs. To synthesize the gigahertz frequency ramps of a FMCW radar system, two frequency combs having different pulse repetition rate frep can be used here. For this purpose, the diameters of the ring resonators 10, 24, 29 are designed differently, so that the frequency combs are slightly spectrally shifted in relation to one another. The difference frequency can in turn be measured by the heterodyne detection unit 26 of the superposition of the two frequency combs. A sequence of the difference frequencies of both combs thus supplies the individual frequencies. For example, the pulse repetition rate frep of a first comb can be 81 GHz, while the pulse repetition rate frep of a second comb can be 0.1 GHz. Both frequency combs are pumped by the same transmission signal 9, are thus in a correlated phase relationship to one another and have the same carrier frequency. In the heterodyne detection, the difference frequencies of fDn=81 GHz−n*0.1 GHz with n elements N result. If the spectral bandwidth of the second comb is sufficiently large, the entire automotive spectral range from 76 GHz to 81 GHz can thus be synthesized in operations of 0.1 GHz. 0.1 GHz operations are solely by way of example and are in no way to be viewed as exhaustive.

To delay the frequencies in time in relation to one another, in particular, to generate a so-called frequency chirp 27, the dispersive element 28 can be used. In particular, all spectral components propagate here at the same time, the pulse thus has the theoretical minimal pulse duration. If a Fourier-limited pulse propagates through a normal dispersive element, such as air, the high-frequency spectral components thus experience a stronger time delay than the low-frequency spectral components. The pulse is positively chirped and thus stretched in time. Furthermore, its peak intensity is reduced. For example, the decoupling waveguide can function as the dispersive element. It is particularly beneficial here that a fundamental soliton propagates in the ring conductor, which is inherently free of dispersion.

FIG. 4 represents a possible exemplary embodiment of the radar chirp here. The two optical ring resonators 10, 24 are pumped by one or more transmission signals 9 and generate frequency combs having different pulse repetition rate frep. By using one or more dispersive elements 28, the desired slope of the frequency ramp is generated after decoupling and transformed by the heterodyne detection unit 26 into the gigahertz frequency range. In particular, the dispersion in the frequency chirp is applied to the individual pulses and both signals are measured by the heterodyne detection unit 26. The resulting frequencies form a ramp in the gigahertz spectral range.

Figure 5:
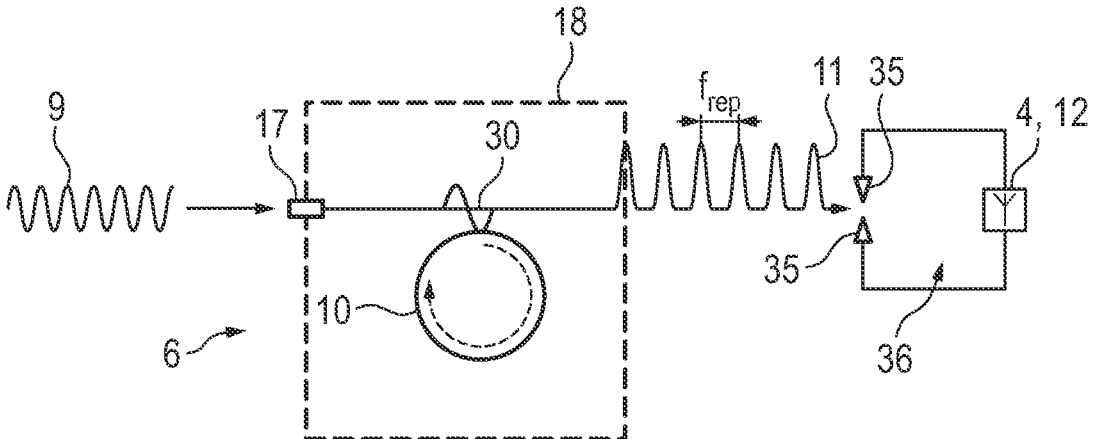
FIG. 5 shows a further schematic block diagram of a disclosed embodiment of a transformation unit of an exemplary embodiment of a radar sensor apparatus.

FIG. 5 shows a further schematic embodiment of a transformation unit 6. In particular, FIG. 5 shows that the pulse repetition rate frep or the difference frequencies can be detected. For this purpose, the transformation unit 6 includes at least two nano-antennas 35 on a semiconductor medium 36 for generating the emission signal 12 as a function of the pulse train 11. In particular, the optical ring resonator 10 is thus used to generate the pulse train 11. The pulse repetition rate frep is detected by the nano-antennas 35, which are applied to the semiconductor medium 36. These metal antennas having dimensions in the range of a few micrometers to nanometers are located spaced apart from one another at a distance of the wavelength of the incident light. If the radiation emitted by the optical ring resonator 10 is incident on the nano-antennas 35, a plasmon resonance or a surface plasmon polariton is thus excited by the distance of the wavelength between the nano-antennas 35, which oscillates at the frequency of the incident light wave. These frequency oscillations are directly electronically measurable and can be used as a driver signal of a gigahertz antenna.

The presented disclosure also relates to a method for operating the radar sensor apparatus 2. The electrical control signal 7 is generated by the electronic processing unit 3 for the transmitting unit 4. The optical transmission signal 9 is generated as a function of the electrical control signal 7 for transmission to the transmitting unit 4 by the laser unit 8. The pulse train 11 is generated as a function of the optical transmission signal 9 by the transformation unit 6 of the radar sensor apparatus 2 having at least one first optical ring resonator 10, wherein in addition the electrical emission signal 12 is generated as a function of the pulse train 11 for the transmitting unit 4 by the transformation unit 6. The electrical emission signal 12 is emitted into the surroundings 13 by the transmitting unit 4. The reception signal 14 is received by the receiving unit and the reception signal 14 is transmitted to the central electronic processing unit 3 by the receiving unit 5.

Overall, the figures show a method for gigahertz frequency generation in photonic-electronic cointegrated semiconductors by optical ring resonators 10, 24, 29.

LIST OF REFERENCE SIGNS 1 transportation vehicle
2 radar sensor apparatus
3 electronic processing unit
4 transmitting unit
5 receiving unit
6 transformation unit
7 electrical control signal
8 laser unit
9 transmission signal 10 first optical ring resonator
11 pulse train
12 emission signal
13 surroundings
14 electrical reception signal
15 object
16 ring line
17 optical coupling element
18 semiconductor
19 radiofrequency driver
20 optical modulator
21 further optical coupling element
22 photodiode
23 power amplifier
24 second optical ring resonator
25 second pulse train
26 heterodyne detection unit
27 frequency chirp
28 dispersive element
29 further optical ring resonator
30 optical waveguide
31 photodiode
32 photodiode
33 mirror element
34 beam splitter
35 nano-antenna
36 semiconductor medium
37 block

The invention claimed is:

1. A radar sensor apparatus for a transportation vehicle, the apparatus comprising:

a central electronic processing unit to generate an electrical control signal for a transmitting unit of the radar sensor apparatus;

a laser, which generates an optical transmission signal to be transmitted to the transmitting unit as a function of the electrical control signal;

a transformation unit having at least one first optical ring resonator, which generates a pulse train as a function of the optical transmission signal, wherein the transformation unit generates an electrical emission signal as a function of the pulse train for the transmitting unit, wherein the transmitting unit emits the electrical emission signal into the surroundings of the transportation vehicle; and a receiving unit for receiving an electrical reception signal corresponding to the electrical emission signal reflected in the surroundings as an electrical reception signal and for transmitting the electrical reception signal to the central electronic processing unit, wherein the transformation unit further comprises an optical coupling element for coupling the optical transmission signal at least into the at least one first optical ring resonator of the transformation unit, wherein the transformation unit and an optical modulator configured to modulate the electrical reception signal onto the optical transmission signal are formed on a semiconductor medium of an electronic-photonic chip, wherein a high quality factor of the at least one first optical ring resonator causes a low-power demand of the laser such that coupling losses are compensated for and a plurality of electronic-photonic chips are operated using one source, and wherein fine-tuning of laser frequency of the laser is performed to prevent an excessive amount of light being coupled into the first optical ring resonator and initiation of mode coupling whereby a pulsed signal cannot be generated in an emission channel of the transmitting unit so that the electronic-photonic chip operates as a receiving channel as well as a transmitting channel.

2. The radar sensor apparatus of claim 1, wherein the transformation unit further comprises an optical photodiode for generating the emission signal as a function of the pulse train.

3. The radar sensor apparatus of claim 1, wherein the transmitting unit and the receiving unit are a common component.

4. The radar sensor apparatus of claim 1, wherein the transformation unit further comprises at least one further optical ring resonator, which is designed differently from the first optical ring resonator, and wherein the pulse train is generated as a function of the first optical ring resonator and the further optical ring resonator.

5. The radar sensor apparatus of claim 1, wherein the transformation unit further comprises a heterodyne detection unit or a homodyne detection unit for generating the emission signal.

6. The radar sensor apparatus of claim 1, wherein the transformation unit further comprises at least one dispersive element to generate at least one frequency chirp as a function of the pulse train.

7. The radar sensor apparatus of claim 6, wherein the transformation unit further comprises at least one second optical ring resonator, wherein a second pulse train, which is different from the pulse train, is generated by the second optical ring resonator, wherein the frequency chirp is generated by a heterodyne detection unit of the transformation unit as a function of the pulse train and the second pulse train.

8. The radar sensor apparatus of claim 1, wherein the transformation unit further comprises at least two nano-antennas on the semiconductor medium for generating the emission signal as a function of the pulse train.

9. A method for operating a radar sensor apparatus, the method comprising:

generating an electrical control signal for a transmitting unit of the radar sensor apparatus by a central electronic processing unit of the radar sensor apparatus;

generating an optical transmission signal as a function of the electrical control signal for transmission to the transmitting unit by a laser of the radar sensor apparatus;

generating a pulse train as a function of the optical transmission signal by a transformation unit of the radar sensor apparatus using at least one first optical ring resonator, wherein, in addition, an electrical emission signal is generated as a function of a pulse train for the transmitting unit by the transformation unit;

emitting the electrical emission signal into the surroundings of the transportation vehicle by the transmitting unit; and

receiving an electrical reception signal, corresponding to an electrical emission signal reflected in the surroundings, by a receiving unit of the radar sensor apparatus and transmitting the electrical reception signal to the central electronic processing unit by the receiving unit, wherein the transformation unit further comprises an optical coupling element for coupling the optical transmission signal at least into the at least one first optical ring resonator, wherein the transformation unit and an optical modulator configured to modulate the electrical reception signal onto the optical transmission signal are all formed on a semiconductor medium of an electronic-photonic chip, wherein a high quality factor of the at least one first optical ring resonator causes a low-power demand of the laser such that coupling losses are compensated for and a plurality of electronic-photonic chips are operated using one source, and wherein fine-tuning of laser frequency of the laser is performed to prevent an excessive amount of light being coupled into the first optical ring resonator and initiation of mode coupling whereby a pulsed signal cannot be generated in an emission channel of the transmitting unit so that the electronic-photonic chip operates as a receiving channel as well as a transmitting channel.

10. The method of claim 9, wherein the transformation unit includes an optical photodiode for generating the emission signal as a function of the pulse train.

11. The method of claim 9, wherein the transmitting unit and the receiving unit are a common component.

12. The method of claim 9, wherein the transformation unit further comprises at least one further optical ring resonator, which is designed differently from the at least one first optical ring resonator, and wherein the pulse train is generated as a function of the at least one first optical ring resonator and the at least one further optical ring resonator.

13. The method of claim 9, wherein the transformation unit further comprises a heterodyne detection unit or a homodyne detection unit for generating the emission signal.

14. The radar sensor apparatus of claim 9, wherein the transformation unit further comprises at least one dispersive element to generate at least one frequency chirp as a function of the pulse train.

15. The method of claim 14, wherein the transformation unit further includes at least one second optical ring resonator, wherein a second pulse train, which is different from the pulse train, is generated by the second optical ring resonator, wherein the frequency chirp is generated by a heterodyne detection unit of the transformation unit as a function of the pulse train and the second pulse train.

16. The method of claim 9, wherein the transformation unit includes at least two nano-antennas on the semiconductor medium for generating the emission signal as a function of the pulse train.

* * * * *